(No Model.)
G. B. PROCHASKA.
METHOD OF POLISHING RICE OR OTHER GRAINS.
No. 483,868. Patented Oct. 4, 1892.
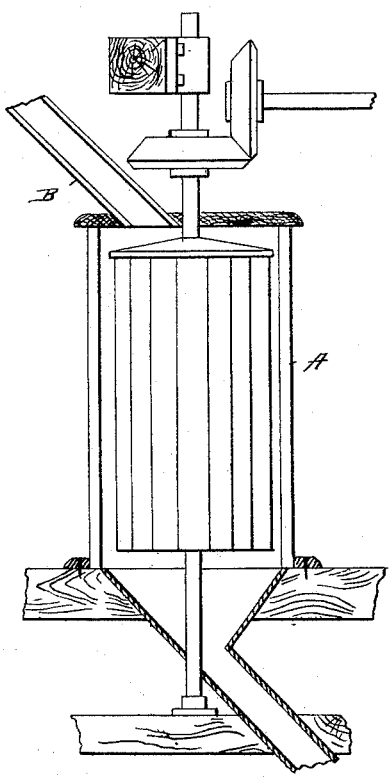
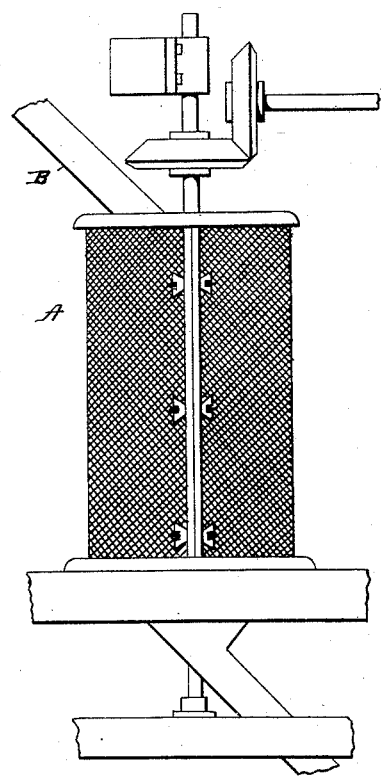
Witnesses:
Inventor:
George B. Prochaska
By W. R. Stringfellow
Attorney

UNITED STATES PATENT OFFICE.

GEORGE B. PROCHASKA, OF NEW ORLEANS, LOUISIANA.

METHOD OF POLISHING RICE OR OTHER GRAINS.

SPECIFICATION forming part of Letters Patent No. 483,868, dated October 4, 1892.

Application filed May 26, 1891. Serial No. 394,028. (No specimens.)

*To all whom it may concern:*

Be it known that I, GEORGE BOUTCHER PROCHASKA, a citizen of the United States, residing at New Orleans, in the parish of Orleans and State of Louisiana, have invented certain new and useful Improvements in Methods of Polishing Rice or other Grains; and I do declare the following to be a full, clear, and exact description of the invention, such as will enable others skilled in the art to which it appertains to make and use the same.

This invention relates to a process of polishing rice, and will be fully understood from the following description when taken in conjunction with the claim appended and the accompanying drawings, in which—

Figure 1 is a side view of an ordinary rice-polishing machine with the discharge-spout in section which I employ, and Fig. 2 is a similar view with the brush incased in a wire cylinder.

The object of my invention is to thoroughly polish rice and to obviate many difficulties that have heretofore arisen in the milling of rice for the trade; and to this end my invention consists in increasing the polish, especially of rice, without any diminution in weight and producing a result in the appearance of each grain that has heretofore been unknown. The soapstone is mixed with the rice in a bin and fed to cylinder A and to the action of the brush through inlet B, and as the brush rotates polishes the rice. The polishing material is carried off through the screen or cylinder after performing its function. It is obvious that the process may be carried out in any rice-mill.

Before describing the details of my invention I wish to say that the apparatus which may be used in carrying out my process may be of the construction and character usually employed in the milling of rice, and as I claim nothing in the apparatus which may be used I shall therefore deem it unnecessary to make a drawing of any machine, as the object which I have in view may be accomplished in such rice-milling machinery as is at present in use.

To carry my invention into effect, while the rice is in the cooling floor-bins and heated from friction I mingle among the heated rice in any desired manner, say, one pound of talc or soapstone of any particular color to each hundred pounds of rice, more or less. I then transfer the rice to polishing-machines of the character usually employed, and after the rice has remained for one hour or a sufficient time to cool, the grains of rice being rendered porous by the heat of friction, the talc or soapstone is readily absorbed on the grains of rice, and while thus treated and run through a polishing-machine is susceptible of a high polish or finish.

Where desired, the talc or soapstone may be applied in connection with oil or in conjunction with a jet of steam, and rice or other grain thus treated has its yield increased by reason of preventing to a certain extent the cracking or breaking of grains of rice during the polishing process.

A striking advantage of my process is the economical manner in which rice may be polished and leaving them in a suitable condition for market.

I am aware that it has heretofore been proposed in cleaning coffee to use soapstone which has been applied in a powdered state to the moistened coffee after it had been sprinkled with water and subjected to agitation in an open-work cylinder. My invention differs from this process, inasmuch as the rice is highly heated by friction before applying the soapstone, and in such condition the grains of rice being porous the soapstone is readily absorbed.

Having described my invention, what I claim, and desire to secure by Letters Patent, is—

The process of preparing and polishing rice, consisting in heating the same in a suitable rice-milling machine, then removing the heated rice and placing the same in the cooling floor-bins, then mingling soapstone therewith, and finally passing the rice through a polishing-machine, substantially as specified.

In testimony whereof I affix my signature in presence of two witnesses.

GEORGE B. PROCHASKA.

Witnesses:
ALPHONSE J. CUNED,
PERCY D. PARKS.